(12) United States Patent
Wang et al.

(10) Patent No.: US 9,648,152 B2
(45) Date of Patent: May 9, 2017

(54) METHODS AND DEVICES FOR LABELING A NUMBER

(71) Applicant: Xiaomi Inc., Beijing (CN)

(72) Inventors: Bin Wang, Beijing (CN); Zhongliang Qiao, Beijing (CN); Shuo Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/982,889

(22) Filed: Dec. 29, 2015

(65) Prior Publication Data

US 2016/0294998 A1 Oct. 6, 2016

(30) Foreign Application Priority Data

Mar. 31, 2015 (CN) .......................... 2015 1 0150053

(51) Int. Cl.
| | | |
|---|---|---|
| *H04M 1/56* | (2006.01) | |
| *H04M 15/06* | (2006.01) | |
| *H04M 1/2745* | (2006.01) | |
| *H04M 3/493* | (2006.01) | |

(Continued)

(52) U.S. Cl.
CPC . *H04M 1/274533* (2013.01); *H04M 3/42042* (2013.01); *H04M 3/42059* (2013.01); *H04M 3/42093* (2013.01); *H04M 3/4931* (2013.01); *H04M 7/0021* (2013.01); *H04M 3/42008* (2013.01); *H04M 2203/354* (2013.01)

(58) Field of Classification Search
CPC ........ H04M 3/42042; H04M 3/42059; H04M 3/436; H04M 3/4365; H04M 3/42068; H04M 1/575

USPC ....................................... 379/142.05, 142.06
See application file for complete search history.

(56) References Cited

U.S. PATENT DOCUMENTS

| | | | |
|---|---|---|---|
| 8,705,707 B1* | 4/2014 | Schilit ............. | H04M 1/274583 379/201.07 |
| 8,775,404 B1* | 7/2014 | Peden ............... | G06F 17/30424 707/709 |
| 2003/0050054 A1 | 3/2003 | Siu | |

(Continued)

FOREIGN PATENT DOCUMENTS

| | | |
|---|---|---|
| CN | 1770790 A | 5/2006 |
| CN | 101159791 A | 4/2008 |

(Continued)

OTHER PUBLICATIONS

International Search Report of PCT Application No. PCT/CN2015/088704 dated Dec. 31, 2015 (4 pages).

(Continued)

*Primary Examiner* — Quoc D Tran
(74) *Attorney, Agent, or Firm* — Finnegan, Henderson, Farabow, Garrett & Dunner LLP

(57) ABSTRACT

A method for a device to label a number is disclosed. The method includes: receiving an application identification of a service application and an unknown number sent from a calling terminal, the unknown number being a telephone number provided to a user by the service application, and the calling terminal invoking a telephone application through the service application to call the unknown number; acquiring an application type of the service application according to the application identification; and labeling the unknown number according to the application type.

9 Claims, 9 Drawing Sheets

(51) Int. Cl.
*H04M 7/00* (2006.01)
*H04M 3/42* (2006.01)

(56) References Cited

U.S. PATENT DOCUMENTS

| | | | |
|---|---|---|---|
| 2013/0014021 A1* | 1/2013 | Bau | G06Q 10/107 715/739 |
| 2013/0045727 A1 | 2/2013 | Ruan et al. | |
| 2014/0334616 A1* | 11/2014 | Jeong | H04M 1/576 379/142.04 |
| 2014/0342707 A1 | 11/2014 | Rincon et al. | |
| 2016/0006868 A1 | 1/2016 | Zhang et al. | |

FOREIGN PATENT DOCUMENTS

| | | |
|---|---|---|
| CN | 101170605 A | 4/2008 |
| CN | 101340642 A | 1/2009 |
| CN | 101540975 A | 9/2009 |
| CN | 101753674 A | 6/2010 |
| CN | 101808086 A | 8/2010 |
| CN | 102231779 A | 11/2011 |
| CN | 102665014 A | 9/2012 |
| CN | 103209400 A | 7/2013 |
| CN | 103220393 A | 7/2013 |
| CN | 103281448 A | 9/2013 |
| CN | 103607498 A | 2/2014 |
| CN | 104010065 A | 8/2014 |
| CN | 104023324 A | 9/2014 |
| CN | 104270521 A | 1/2015 |
| CN | 104378480 A | 2/2015 |
| CN | 104427074 A | 3/2015 |
| CN | 104836924 A | 8/2015 |
| KR | 10-2015-0030444 | 3/2015 |

OTHER PUBLICATIONS

Extended European Search Report of European Application No. 15193528.5, dated Feb. 19, 2016 (11 pages).

English version of International Search Report of PCT No. PCT/CN2015/088704, dated Dec. 31, 2015 (2 pages).

* cited by examiner

METHODS AND DEVICES FOR LABELING A NUMBER

The present application is based upon and claims priority to Chinese Patent Application No. CN201510150053.6, filed Mar. 31, 2015, the entire contents of which are incorporated herein by reference.

TECHNICAL FIELD

The present disclosure generally relates to the field of computer technology, and more particularly, to methods and devices for labeling a number.

BACKGROUND

Users often receive unknown calls. When an unknown call is a harassing phone call, a user may label the harassing phone call such that the user may directly reject the harassing phone call next time the harassing phone call comes in.

The related art provides a method for labeling a number. After a terminal receives and hangs up a phone call of an unknown number, an identification label input by the user according to the contents of the conversation is acquired. The identification label and the unknown number are sent to a server. The server stores the corresponding relationship between the unknown number and the identification label and pushes the corresponding relationship to other terminals such that users of other terminals may determine whether to accept calls according to the identification label when they receives calls associated with the unknown number.

SUMMARY

According to a first aspect of the present disclosure, there is provided a method for a device to label a number. The method includes: receiving an application identification of a service application and an unknown number sent from a calling terminal, the unknown number being a telephone number provided to a user by the service application, and the calling terminal invoking a telephone application through the service application to call the unknown number; acquiring an application type of the service application according to the application identification; and labeling the unknown number according to the application type.

According to another aspect of the present disclosure, there is provided a device for labeling a number. The device includes a processor; and a memory for storing instructions executable by the processor. The processor is configured to perform: receiving an application identification of a service application and an unknown number sent from a calling terminal, the unknown number being a telephone number provided to a user by the service application, and the calling terminal invoking a telephone application through the service application to call the unknown number; acquiring an application type of the service application according to the application identification; and labeling the unknown number according to the application type.

According to another aspect of the present disclosure, there is provided a non-transitory computer-readable storage medium storing instructions that, when executed by a processor of a server, cause the server to perform: receiving an application identification of a service application and an unknown number sent from a calling terminal, the unknown number being a telephone number provided to a user by the service application, and the calling terminal invoking a telephone application through the service application to call the unknown number; acquiring an application type of the service application according to the application identification; and labeling the unknown number according to the application type.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
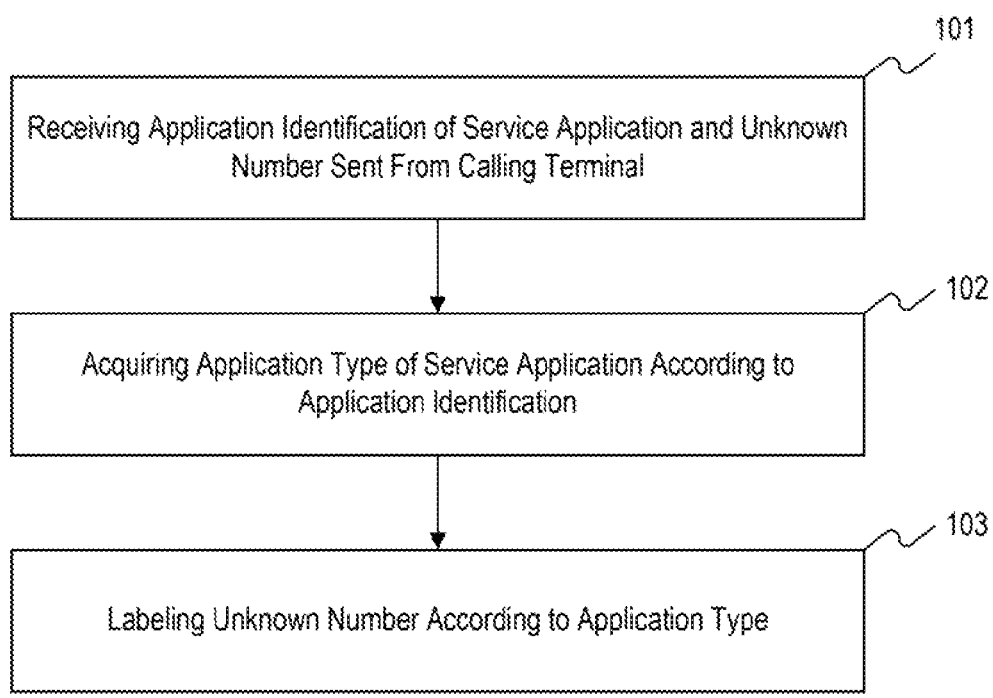
FIG. 1 is a flow chart of a method for labeling a number according to an exemplary embodiment.

FIG. 1 is a flow chart of a method 100 for labeling a number according to an exemplary embodiment, which may be executed in a server. As shown in FIG. 1, the method 100 for labeling a number includes the following steps.

In step 101, an application identification of a service application and an unknown number sent from a calling terminal are received. The unknown number is a telephone number provided to a user by the service application, and the calling terminal invokes a telephone application through the service application to call the unknown number.

In step 102, an application type of the service application is acquired according to the application identification.

In step 103, the unknown number is labeled according to the application type.

Accordingly, in the method 100 for labeling a number provided by the present disclosure, an application identification of a service application and an unknown number sent from a calling terminal are received. The unknown number is a telephone number provided to a user by the service application, and the calling terminal invokes a telephone application through the service application to call the unknown number. An application type of the service application is acquired according to the application identification, and the unknown number is labeled according to the application type. Since the unknown number provided by the service application can provide a certain type of service to the user, the unknown number can be labeled according to the application type of the service application. It solves the problem that the user may input an incorrect identification label for an unknown number, resulting in inaccurate labeling of the unknown number. The method 100 improves the accuracy in labeling an unknown number.

Figure 2:
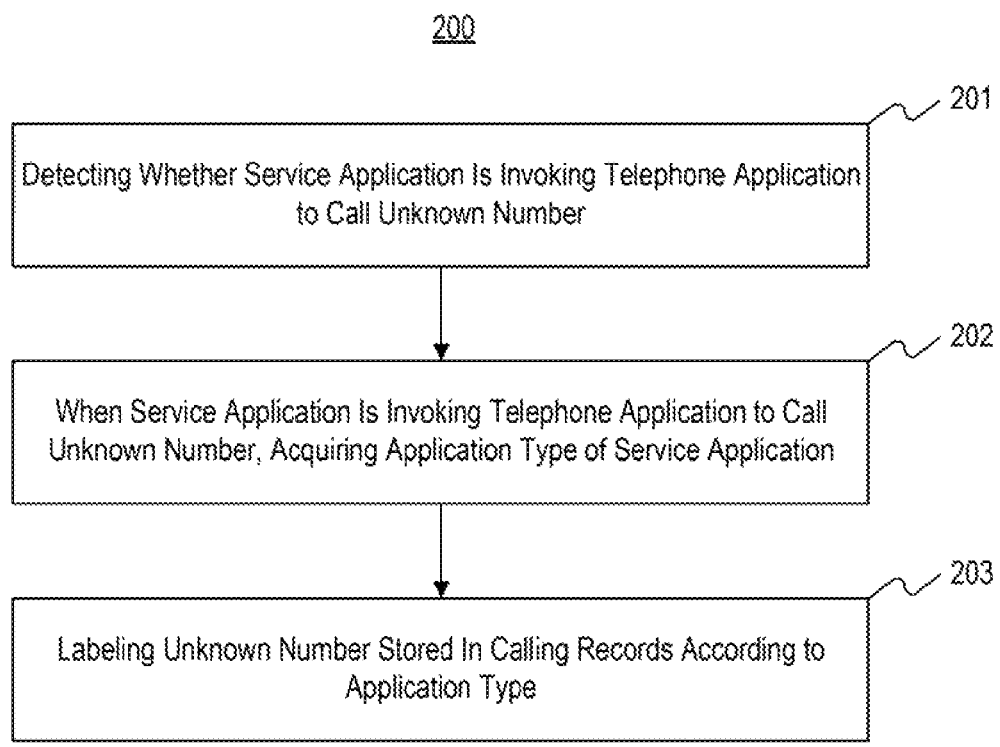
FIG. 2 is a flow chart of a method for labeling a number according to an exemplary embodiment.

FIG. 2 is a flow chart of a method 200 for labeling a number according to an exemplary embodiment, which may be executed in a calling terminal. As shown in FIG. 2, the method 200 for labeling a number includes the following steps.

In step 201, it is detected whether a service application is invoking a telephone application to call an unknown number. The unknown number is a telephone number provided by the service application to a user.

In step 202, when a service application is invoking the telephone application to call the unknown number, an application type of the service application is acquired.

In step 203, the unknown number stored in calling records is labeled according to the application type.

Accordingly, in the method 200 for labeling a number provided by the present disclosure, when a service application is invoking the telephone application to call the unknown number, an application type of the service application is acquired. The unknown number stored in calling records is labeled according to the application type. Since the unknown number provided by the service application can provide a certain type of service to the user, the unknown number can be labeled according to the application type of the service application. It solves the problem that the user may input an incorrect identification label, resulting in inaccurate labeling of the unknown number. The method 200 improves the accuracy in labeling an unknown number.

Figure 3:
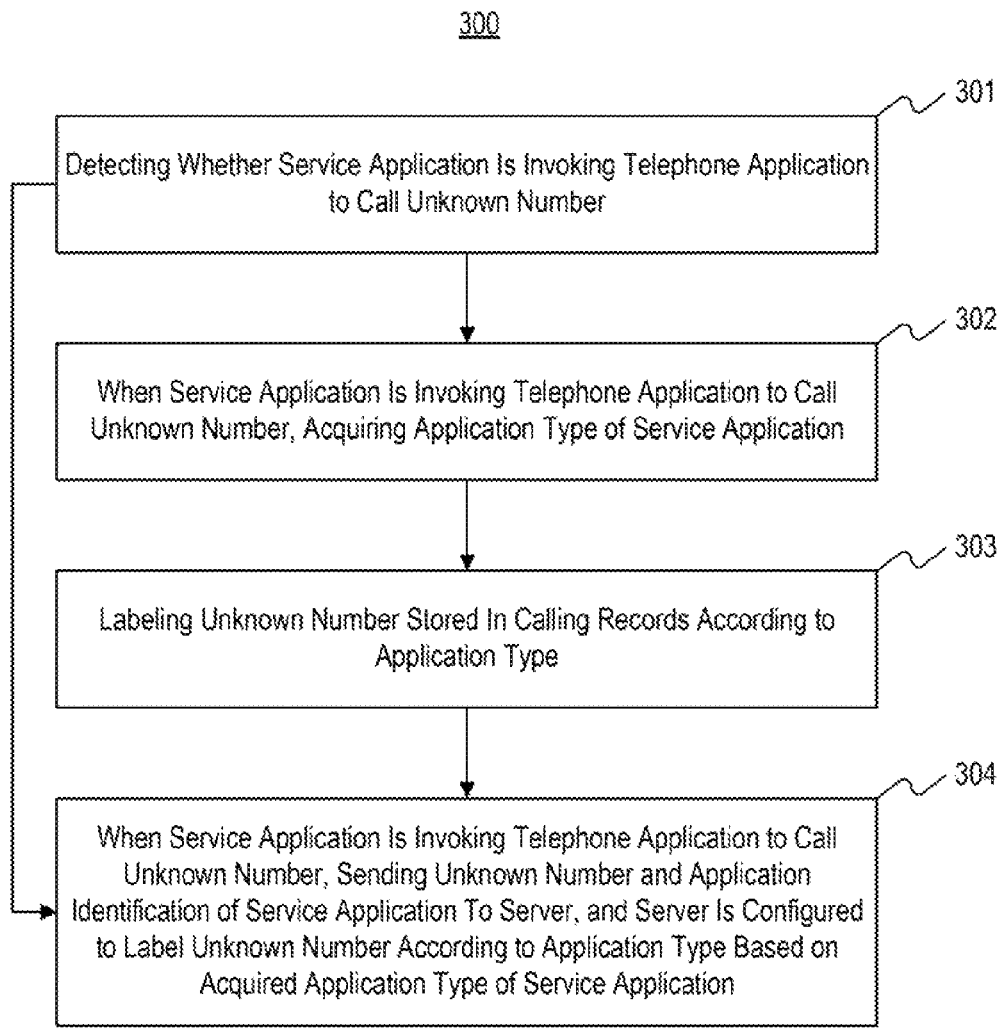
FIG. 3 is a flow chart of a method for labeling a number according to an exemplary embodiment.

FIG. 3 is a flow chart of a method 300 for labeling a number according to an exemplary embodiment, which may be executed in a calling terminal. As shown in FIG. 3, the method 300 for labeling a number includes the following steps.

In step 301, it is detected whether a service application is invoking a telephone application to call an unknown number. The unknown number is a telephone number provided by the service application to a user.

A telephone application is an application for calling a telephone number, and can be provided by an operating system of the calling terminal.

A service application is an application having a permission to invoke the telephone application. In the present embodiment, the service application can provide an unknown number to a user, and present a calling icon on a display screen for calling the unknown number to the user. After the user clicks the calling icon, the service application invokes the telephone application to call the unknown number. The unknown number can be pushed by a server to the service application, or can be included in the service application by a developer in developing the service application. How the service application obtains the unknown number is not limited by the embodiments of the present disclosure.

In one exemplary embodiment, the service application is a taxi application, which can provide a telephone number of a nearby driver to the user. At this time, the telephone number is an unknown number to the user. The taxi application also presents a calling icon on a screen for calling the telephone number. After the user clicks the calling icon, the taxi application invokes the telephone application to call the telephone number of the taxi driver.

In another exemplary embodiment, the service application is a courier application, which can provide the user with a telephone number of a delivery man who is handling an express delivery to the user. At this time, the telephone number is an unknown number to the user. The courier application also provides a calling icon for calling the telephone number. After the user clicks the calling icon, the courier application invokes the telephone application to call the telephone number of the delivery man.

In the present embodiment, the calling terminal can monitor an application programming interface (API) of the telephone application. When it detects that a certain service application is invoking the API, it is determined that the service application is invoking the telephone application to call the unknown number.

In step 302, when a service application is invoking the telephone application to call the unknown number, an application type of the service application is acquired.

In some embodiments, the calling terminal can label the unknown number with the application identification. Since the application identification may not be intuitive, the calling terminal can also label the unknown number according to the application name, the application type or other information of the service application. When the unknown number is to be labeled with the application type and the application type of the service application has been stored in the calling terminal, the calling terminal can read out the application type and label the unknown number in the calling records according to the application type. If the application type of the service application is not stored in the calling terminal, the calling terminal can acquire the application type from the server, and label the unknown number in the calling records according to the application type. For example, if the service application is a taxi application, the application type can be taxi service; and if the service application is a courier application, the application type can be courier service.

In step 303, the unknown number stored in calling records is labeled according to the application type.

When the unknown number stored in calling records is labeled according to the application type, the calling terminal can use the application type as the label of the unknown number. Or the calling terminal can acquire an attribute corresponding to the application type and use the attribute to label the unknown number. The attribute label indicates a user type of the unknown number. For example, if the service application is a taxi application, the attribute label may indicate that a user of the unknown number is a driver; and if the service application is a courier application, the attribute label may indicate that a user of the unknown number is a delivery man.

In step 304, when a service application is invoking the telephone application to call the unknown number, the unknown number and an application identification of the service application are sent to a server. The server is configured to label the unknown number according to the application type based on the acquired application type of the service application.

The calling terminal can learn which service application is invoking the telephone application, and thus read the application identification of the service application, which identifies one service application. The calling terminal can also acquire the unknown number called by the telephone application, and send the unknown number and the application identification to the server. The server determines the application type of the service application according to the application identification, and labels the unknown number according to the application type.

After the server labels the unknown number according to the application type, in case where the calling terminal corresponding to the unknown number calls another terminal and the unknown number is not included in the calling records of said another terminal, said another terminal may request for the label corresponding to the unknown number from the server. The server sends the label corresponding to the unknown number to said another terminal, such that the user of said another terminal can determine a user type of the called terminal according to the label, and then determine whether to accept the call.

In the present embodiment, the order in performing steps 302 through 304 is not restricted. For example, step 302 can be performed before step 304, or after step 304, or simultaneously with step 304.

Accordingly, in the method 300 for labeling a number provided by the present disclosure, when a service application is invoking the telephone application to call the unknown number, an application type of the service application is acquired. The unknown number stored in calling records is labeled according to the application type. Since the unknown number provided by the service application can provide a certain type of service to the user, the unknown number can be labeled according to the application type of the service application. It solves the problem that the user may input an incorrect identification label, resulting in inaccurate labeling of the unknown number. The method 300 improves the accuracy in labeling an unknown number.

Further, labeling an unknown number stored in the calling records according to an application type solves the problem that in case where multiple unknown numbers are stored in the calling records, the user cannot discern between the unknown numbers. The method 300 allows the user to discern between unknown numbers.

Figure 4:
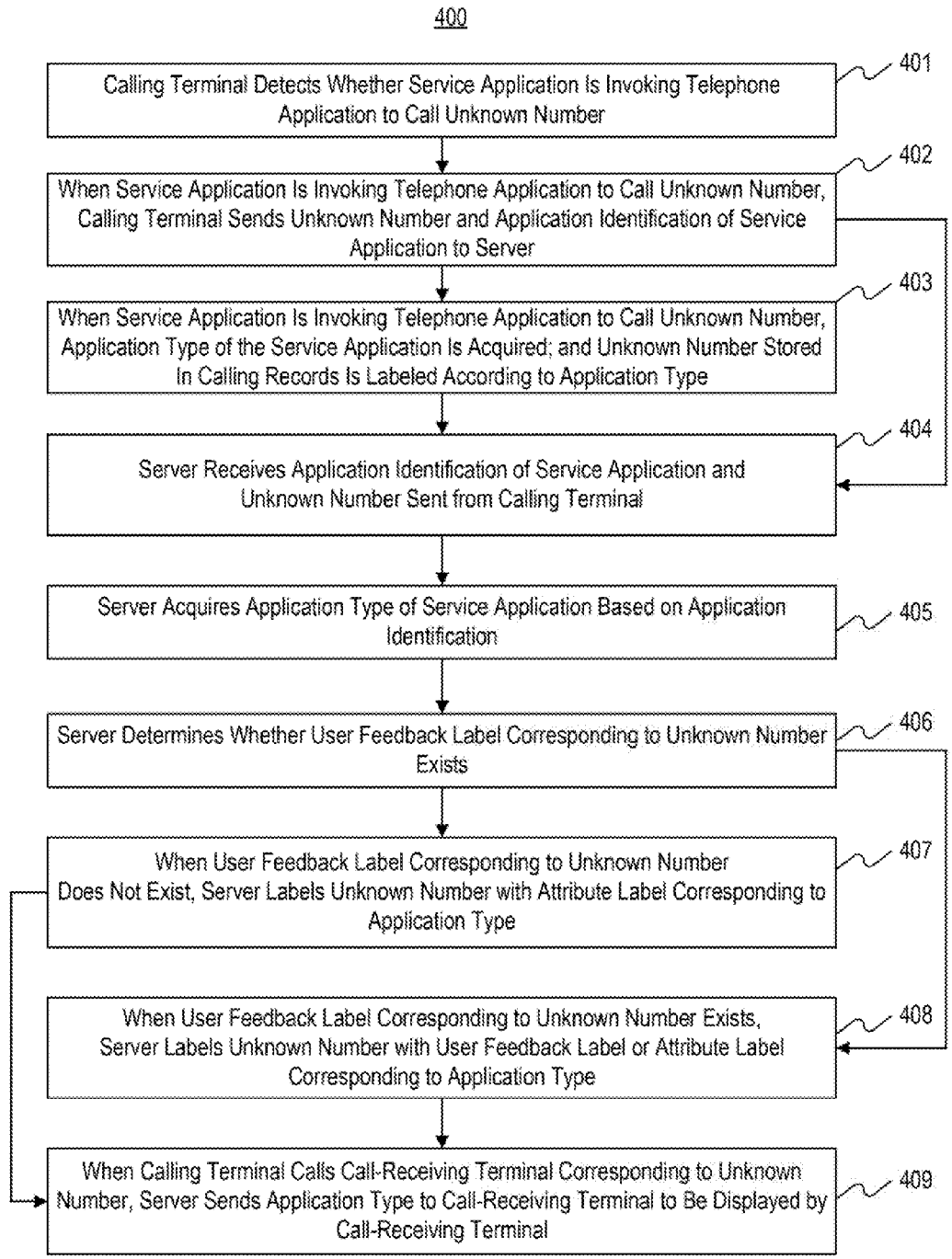
FIG. 4 is a flow chart of a method for labeling a number according to another exemplary embodiment.

FIG. 4 is a flow chart of a method 400 for labeling a number according to another exemplary embodiment, which may be executed in a system including a server and a calling terminal. As shown in FIG. 4, the method 400 for labeling a number includes the following steps.

In step 401, the calling terminal detects whether a service application is invoking a telephone application to call an unknown number. The unknown number is a telephone number provided by the service application to a user.

A telephone application is an application for calling a telephone number, and can be provided by an operating system of the calling terminal.

A service application is an application having a permission to invoke the telephone application. In the present embodiment, the service application can provide an unknown number to a user, and present a calling icon for calling the unknown number to the user. After the user clicks the calling icon, the service application invokes the telephone application to call the unknown number. The unknown number can be pushed to the service application by a server, or can be included in the service application by a developer in developing the service application. How the service application obtains the unknown number is not limited by the embodiments of the present disclosure.

In one exemplary embodiment, the service application is a taxi application which can provide a telephone number of a nearby driver to the user. At this time, the telephone number is an unknown number to the user. The taxi application also presents a calling icon for calling the telephone number. After the user clicks the calling icon, the taxi application invokes the telephone application to call the telephone number of the taxi driver.

In another exemplary embodiment, the service application is a courier application which can provide the user with a telephone number of a delivery man who is handling an express delivery to the user. At this time, the telephone number is an unknown number to the user. The express delivery application also provides a calling icon for calling the telephone number of the delivery man. After the user clicks the calling icon, the courier application invokes the telephone application to call the telephone number.

In the present embodiment, the calling terminal can monitor an API of the telephone application. When it detects that a certain service application is invoking the API, it is determined that the service application is invoking the telephone application to call the unknown number.

In step 402, when a service application is invoking the telephone application to call the unknown number, the calling terminal sends the unknown number and an application identification of the service application to a server.

The calling terminal can learn which service application is invoking the telephone application, and thus the calling terminal can read the application identification of the service application which identifies one service application. The calling terminal can also acquire the unknown number called by the telephone application, and send the unknown number and the application identification to the server.

In step 403, when a service application is invoking the telephone application to call the unknown number, an application type of the service application is acquired; and the unknown number stored in calling records is labeled according to the application type.

After it calls the unknown number, the calling terminal stores the unknown number in the calling records. In case where multiple unknown numbers are stored in the calling records, it is difficult for the user to discern the unknown numbers. Since the unknown number provided by the service application can provide a certain type of service to the user, the calling terminal can label the unknown number according to the application type of the service application. This allows the user to conveniently manage the unknown numbers stored in the calling records.

In some embodiments, the calling terminal can label the unknown number with the application identification. But, since the application identification may not be intuitive, the calling terminal can also label the unknown number according to the application name, the application type or other information of the service application. When the unknown number is to be labeled with the application type and the application type of the service application has been stored in the calling terminal, the calling terminal can read out the application type and label the unknown number stored in the calling records according to the application type. If the application type of the service application is not stored in the calling terminal, the calling terminal can acquire the application type from the server, and label the unknown number stored in the calling records according to the application type. For example, if the service application is a taxi application, the application type can be a taxi service; and if the service application is a courier application, the application type can be a courier service.

When the unknown number stored in calling records is labeled according to the application type, the calling terminal can use the application type as the label of the unknown number. Or the calling terminal can also acquire an attribute corresponding to the application type and use the attribute to label the unknown number. The attribute label indicates a user type of the unknown number. For example, if the service application is a taxi application, the attribute label may indicate that a user of the unknown number is a driver, and if the service application is a courier application, the attribute label may indicate that a user of the unknown number is a delivery man.

In the present embodiment, the terminal can only perform step 402, or only step 403, or both of step 402 and step 403. But the present embodiment does not limit the order in performing step 402 and step 403. That is, step 402 can be performed before step 403, or after step 403, or simultaneously with step 403.

In step 404, the server receives an application identification of the service application and the unknown number sent from the calling terminal. The unknown number is a telephone number provided to a user by the service application. And the calling terminal invokes a telephone application through the service application to call the unknown number.

In step 405, the server acquires an application type of the service application based on the application identification.

Corresponding relationships between application identifications and application types may be pre-stored in the server. The corresponding relationships can be manually collected, or can also be collected in other manners. The source of the corresponding relationships is not limited in the present embodiment.

In step 406, the server determines whether a user feedback label corresponding to the unknown number exists. The user feedback label may be a feedback label about a user type of the unknown number, which is collected from a previous user of the service application or other applications. For example, after user A accepts a call of an unknown number a, it may be determined according to the contents of the conversation that the unknown number a is of a delivery man. At this time, a user feedback label "delivery man" can be generated and sent to the server. The server stores the user feedback label "delivery man" as corresponding to the unknown number, sets a number of calls received from the "delivery man" to 1, and records a time when the user feedback label is generated. After a time period, a calling terminal of user B also accepts a call of the unknown number a, generates a user feedback label "delivery man," and sends it to the server. The server increases the number of calls from "delivery man" to 2, and updates the generation time of the user feedback label with the time of this second call.

Since the server labels the unknown number according to the application type, when a user feedback label corresponding to the unknown number exists in the server, the server can label the unknown number according to the user feedback label and the application type.

In step 407, when a user feedback label corresponding to the unknown number does not exist, the server labels the unknown number with an attribute label corresponding to the application type. The attribute label is for labeling a user type of the unknown number.

When a user feedback label corresponding to the unknown number does not exist in the server, the server can use the application type to label the unknown number, or acquire an attribute label corresponding to the application type, and use the attribute label to label the unknown number. The attribute label indicates a user type of the unknown number. For example, if the service application is a taxi application, the attribute label may indicate that a user of the unknown number is a driver, and if the service application is a courier application, the attribute label may indicate that a user of the unknown number is a delivery man.

In step 408, when a user feedback label corresponding to the unknown number exists, the server labels the unknown number with the user feedback label or the attribute label corresponding to the application type. The attribute label is for labeling a user type of the unknown number.

When the server includes a user feedback label corresponding to the unknown number, the server can also check the user feedback label. If the user feedback label is accurate, the unknown number can be labeled with the user feedback label or the attribute label; and if the user feedback label is not accurate, the unknown number can be labeled with the attribute label, thereby it may ensure that the unknown number is accurately labeled.

In exemplary embodiments, labeling the unknown number with the user feedback label or the attribute label corresponding to the application type, includes:

1) detecting whether the attribute label is identical to the user feedback label;

2) when the attribute label is different from the user feedback label, acquiring a most recent user feedback label, and detecting whether a time duration between a first time when the user feedback label is generated and a current time is longer than a predetermined time duration;

3) when the time duration between the first time and the current time is longer than the predetermined time duration, labeling the unknown number with the attribute label.

The server can detect whether the attribute label is identical to the user feedback label. When the attribute label is identical to the user feedback label, it determines that the user feedback label is accurate, and labels the unknown number with the user feedback label. When the attribute label is different from the user feedback label, the server can, based on the acquired most recent user feedback label, calculate a time duration between the time when the user feedback label is generated and the current time. The server can further detect whether the time duration is longer than a predetermined time duration. When the time duration is longer than the predetermined time duration, it determines that the user feedback label is invalid, and labels the unknown number with the attribute label.

For example, the server received a user feedback label "delivery man" on Jan. 2, 2014, received a user feedback label "delivery man" on Feb. 10, 2014, and acquired an attribute label "driver" on Mar. 10, 2015; and the predetermined time duration is 12 months. The server calculates that it is 13 months between the generation time of the most recent user feedback label and the current time, which is longer than the predetermined time duration of 12 months, and determines that the user feedback label "delivery man" is not accurate. Then the user feedback label "delivery man" is deleted, and the unknown number is labeled with the attribute label "driver".

In some embodiments, the method 400 provided by the present embodiment also includes:

1) when the time duration between the generation time of a user feedback label and the current time is shorter than the predetermined time duration, determining a first number of times the user feedback label is received and a second number of times the attribute label is received within a predetermined time period;

2) when a difference between the second number and the first number is greater than a predetermined threshold, labeling the unknown number with the attribute label; and 3) when the difference between the second number and the first number is smaller than or equal to the predetermined threshold, labeling the unknown number with the user feedback label.

For example, the server received a user feedback label "delivery man" on Nov. 10, 2014, and acquired an attribute label "driver" on Mar. 10, 2015; and the predetermined time duration is 12 months. The server calculates the time duration between the time when the most recent user feedback label is received and the current time is 4 months, which is shorter than the predetermined time duration of 12 months. Then the server labels the unknown number according to a first number of times the user feedback label is received and a second number of times the attribute label is received within a predetermined time period.

In the illustrated embodiment, the predetermined time period is from Sep. 10, 2014 to Mar. 10, 2015, and the predetermined threshold is 10. The server determines that the first number of times the user feedback label "delivery man" is received is 1, and the second number of times the attribute label "driver" is received is 12. The difference between the second number and the first number is 11, which is larger than the predetermined threshold of 10. Thus, the server determines that the user feedback label "delivery man" is not accurate. Then, the user feedback label "delivery man" is deleted, and the unknown number is labeled with the attribute label "driver". But if the second number of times is 8, and the difference between the second number and the first number is 7, which is smaller than the predetermined threshold of 10, the server deletes the attribute label "driver", and labels the unknown number with the user feedback label "delivery man", or the server can prompt an administer to manually label the unknown number.

In step 409, when the calling terminal calls a call-receiving terminal corresponding to the unknown number, the server sends the application type to the call-receiving terminal. The call-receiving terminal is configured to display the application type.

In one embodiment, the calling terminal can send a terminal identification of the call-receiving terminal corresponding to the unknown number to the server when it is calling the call-receiving terminal. The server determines that the calling terminal is calling the call-receiving terminal upon reception of the terminal identification, and determines the call-receiving terminal according to the terminal identification.

In another embodiment, the call-receiving terminal corresponding to the unknown number sends a request for inquiring a call source upon receipt of a call from the calling terminal. The request may be for requesting an application type of the service application, and include a first telephone number of the call-receiving terminal and a second telephone number of the calling terminal. The server reads the first telephone number of the call-receiving terminal and the second telephone number of the calling terminal from the request for inquiring a calling source. The server determines whether currently a calling terminal of the second telephone number is sending an unknown number and an application identification to the server, and whether the unknown number is the same as the first telephone number of the call-receiving terminal. If a calling terminal of the second telephone number is sending an unknown number and an application identification to the server, and the unknown number is the same as the first telephone number of the call-receiving terminal, the server acquires an application type of the application identification and sends the application type to the call-receiving terminal. The call-receiving terminal can display the application type on a calling interface such that the user of the call-receiving terminal can determine the source of the call according to the application type and determine whether to accept the call.

After the server labels the unknown number according to the application type, if the call-receiving terminal corresponding to the unknown number is calling another terminal, and the unknown number is not included in the calling records of said another terminal, said another terminal may request for the label corresponding to the unknown number from the server. The server sends the label corresponding to the unknown number to said another terminal such that the user of said another terminal can determine the user type of the call-receiving terminal according to the label and determine whether to accept the call.

Because the server can acquire the unknown number provided by a service application of the calling terminal, and label the unknown number according to the application type, the server does not need to purchase the unknown number from the provider of the service application, and the cost of labeling the unknown number can be lowered.

Accordingly, in the exemplary methods for labeling a number consistent with embodiments of the present disclosure, a server receives an application identification of a service application and an unknown number sent from a calling terminal. The unknown number is a telephone number provided to a user by the service application, and the calling terminal invokes a telephone application through the service application to call the unknown number. The server acquires an application type of the service application according to the application identification and labels the unknown number according to the application type. Because the unknown number provided by the service application can provide a certain type of service to the user, the unknown number can be labeled according to the application type of the service application. It solves the problem that a user may input an incorrect identification label, resulting in inaccurate labeling of the unknown number. The methods improve the accuracy in labeling the unknown number.

In addition, a request for inquiring a calling source sent from the call-receiving terminal corresponding to the unknown number is received. The request for inquiring a calling source is a request for an application type of a service application sent by the call-receiving terminal upon receipt of a call. The application type is sent to the call-receiving terminal, such that the source of the call can be provided to the call-receiving terminal and displayed to the user so that the user can determine whether to accept the call.

Further, labeling an unknown number stored in the calling records according to an application type solves the problem that in case where multiple unknown numbers are stored in the calling records, the user cannot discern between the unknown numbers. The method 300 allows the user to discern between unknown numbers.

Figure 5:
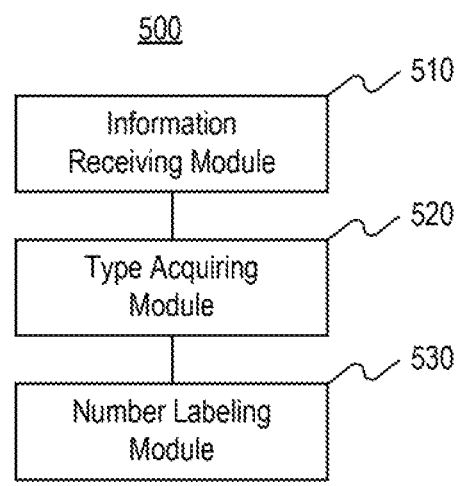
FIG. 5 is a block diagram of a device for labeling a number according to an exemplary embodiment.

FIG. 5 is a block diagram of a device 500 for labeling a number according to an exemplary embodiment, which may be implemented in a server. As shown in FIG. 5, the device 500 for labeling a number includes an information receiving module 510, a type acquiring module 520, and a number labeling module 530.

The information receiving module 510 is configured to receive an application identification of a service application and an unknown number sent from a calling terminal. The unknown number is a telephone number provided to a user by the service application, and the calling terminal invokes a telephone application through the service application to call the unknown number.

The type acquiring module 520 is configured to acquire an application type of the service application according to the application identification received by the information receiving module 510.

The number labeling module 530 is configured to label the unknown number according to the application type acquired by the type acquiring module 520.

Accordingly, the device 500 for labeling a number consistent with the embodiments of the present disclosure receives an application identification of a service application and an unknown number sent from a calling terminal. The unknown number is a telephone number provided to a user by the service application, and the calling terminal invokes a telephone application through the service application to call the unknown number. An application type of the service application is acquired according to the application identification, and the unknown number is labeled according to the application type. Since the unknown number provided by the service application can provide a certain type of service to the user, the unknown number can be labeled according to the application type of the service application. It solves the problem that the user may input an incorrect identification label for an unknown number, resulting in inaccurate labeling of the unknown number. The device 500 improves the accuracy in labeling an unknown number.

Figure 6:
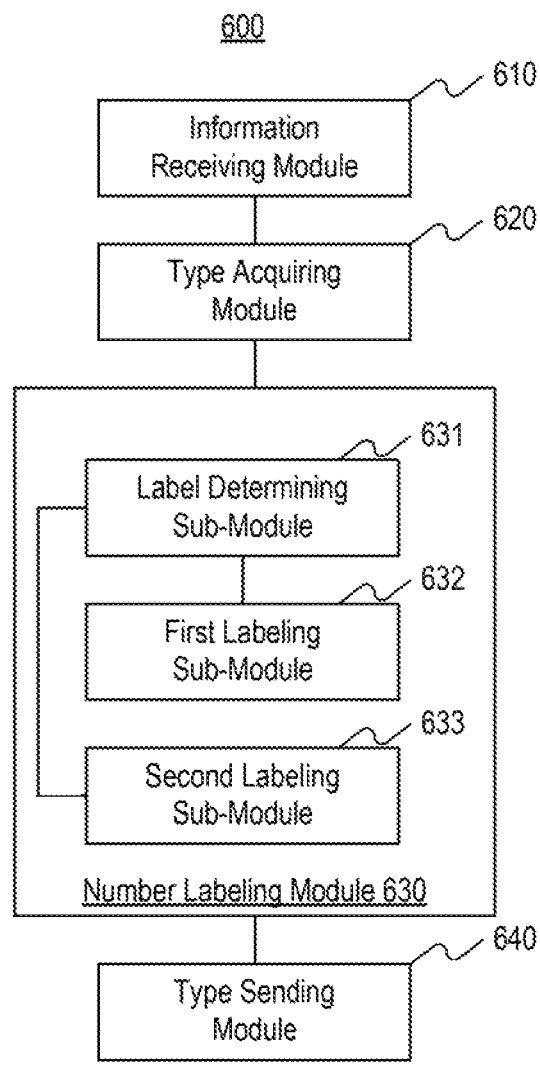
FIG. 6 is a block diagram of a device for labeling a number according to an exemplary embodiment.

FIG. 6 is a block diagram of a device 600 for labeling a number according to an exemplary embodiment, which is implemented in a server. As shown in FIG. 6, the device 600 for labeling a number includes an information receiving module 610, a type acquiring module 620, and a number labeling module 630.

The information receiving module 610 is configured to receive an application identification of a service application and an unknown number sent from a calling terminal. The unknown number is a telephone number provided to a user by the service application, and the calling terminal invokes a telephone application through the service application to call the unknown number;

The type acquiring module 620 is configured to acquire an application type of the service application according to the application identification received by the information receiving module 610.

The number labeling module 630 is configured to label the unknown number according to the application type acquired by the type acquiring module 620.

In some embodiments, the number labeling module 630 includes a label determining sub-module 631, a first labeling sub-module 632, and a second labeling sub-module 633.

The label determining sub-module 631 is configured to determine whether a user feedback label corresponding to the unknown number exists. The user feedback label may be a feedback label about a user type of the unknown number, which is collected from a previous user of the service application or other applications.

The first labeling sub-module 632 is configured to, when the label determining sub-module 631 determines that a user feedback label corresponding to the unknown number does not exist, label the unknown number with an attribute label corresponding to the application type.

The second labeling sub-module 633 is configured to, when the label determining sub-module 631 determines that a user feedback label corresponding to the unknown number exists, label the unknown number with the user feedback label or the attribute label corresponding to the application type. The attribute label is for labeling a user type of the unknown number.

In some embodiments, the second labeling sub-module 633 is further configured to detect whether the attribute label is identical to the user feedback label; when the attribute label is different from the user feedback label, acquire a most recent user feedback label and detect whether a time duration between a first time when the user feedback label is generated and a current time is longer than a predetermined time duration; and when the time duration between the first time and the current time is longer than the predetermined time duration, label the unknown number with the attribute label.

In some embodiments, the second labeling sub-module 633 is further configured to when the time duration between the first time and the current time is shorter than the predetermined time duration, determining a first number of times the user feedback label is received and a second number of times the attribute label is received within a predetermined time period; when a difference between the second number and the first number is greater than a predetermined threshold, labeling the unknown number with the attribute label; and when a difference between the second receiving number and the first receiving number is smaller than or equal to the predetermined threshold, labeling the unknown number with the user feedback label.

In some embodiments, the device 600 further includes a type sending module 640 configured to, when the calling terminal calls a call-receiving terminal corresponding to the unknown number, send the application type to the call-receiving terminal. The call-receiving terminal is configured to display the application type.

Accordingly, the device 600 receives an application identification of a service application and an unknown number sent from a calling terminal. The unknown number is a telephone number provided to a user by the service application, and the calling terminal invokes a telephone application through the service application to call the unknown number. An application type of the service application is acquired according to the application identification, and the unknown number is labeled according to the application type. Since the unknown number provided by the service application can provide a certain type of service to the user, the unknown number can be labeled according to the application type of the service application. It solves the problem that the user may input an incorrect identification label for an unknown number, resulting in inaccurate labeling of the unknown number. The device 600 improves the accuracy in labeling an unknown number.

In addition, the device 600 receives a request for inquiring a calling source sent from the call-receiving terminal corresponding to the unknown number. The request for inquiring a calling source is a request for an application type of a service application sent by the call-receiving terminal upon receipt of a call. The application type is sent to a call-receiving terminal, such that the source of the call can be provided to the call-receiving terminal for the user to determine whether to accept the call.

Figure 7:
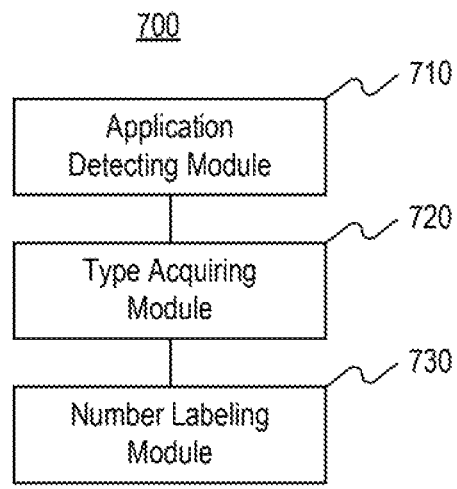
FIG. 7 is a block diagram of a device for labeling a number according to an exemplary embodiment.

FIG. 7 is a block diagram of a device 700 for labeling a number according to an exemplary embodiment, which is implemented in a calling terminal. As shown in FIG. 7, the device 700 for labeling a number includes an application detecting module 710, a type acquiring module 720, and a number labeling module 730.

The application detecting module 710 is configured to detect whether a service application is invoking a telephone application to call an unknown number. The unknown number is a telephone number provided to a user by the service application.

The type acquiring module 720 is configured to, when the application detecting module 710 detects that a service application is invoking the telephone application to call the unknown number, acquire an application type of the service application.

The number labeling module 730 is configured to label the unknown number stored in calling records according to the application type acquired by the type acquiring module 720.

Accordingly, when a service application is invoking the telephone application to call the unknown number, the device 700 acquires an application type of the service application. The unknown number stored in calling records is labeled according to the application type. Since the unknown number provided by the service application can provide a certain type of service to the user, the unknown number can be labeled according to the application type of the service application. It solves the problem that the user may input an incorrect identification label for an unknown number, resulting in inaccurate labeling of the unknown number. The device 700 improves the accuracy in labeling an unknown number.

Figure 8:
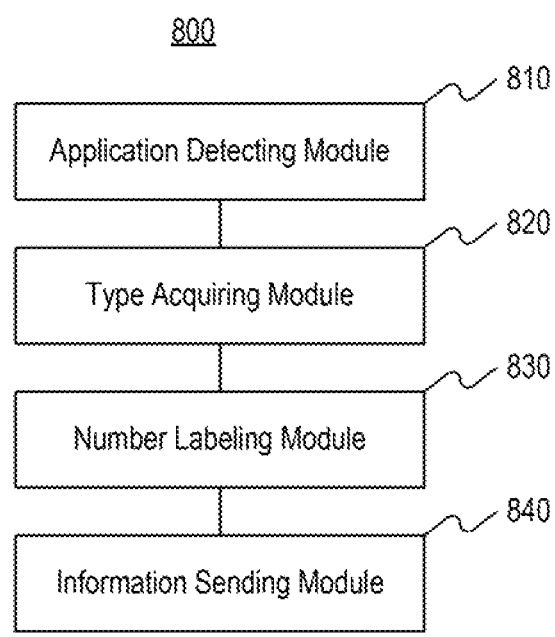
FIG. 8 is a block diagram of a device for labeling a number according to an exemplary embodiment.

FIG. 8 is a block diagram of a device 800 for labeling a number according to an exemplary embodiment, which is implemented in a calling terminal. As shown in FIG. 8, the device 800 for labeling a number includes an application detecting module 810, a type acquiring module 820, and a number labeling module 830.

The application detecting module 810 is configured to detect whether a service application is invoking a telephone application to call an unknown number. The unknown number is a telephone number provided to a user by the service application.

The type acquiring module 820 is configured to, when the application detecting module 810 detects that a service application is invoking the telephone application to call the unknown number, acquire an application type of the service application.

The number labeling module 830 is configured to label the unknown number stored in calling records according to the application type acquired by the type acquiring module 820.

In some embodiments, the device 800 further includes an information sending module 840 configured to, when a service application is invoking the telephone application to call the unknown number, send the unknown number and an application identification of the service application to a server. The server is configured to label the unknown number according to the application type based on the acquired application type of the service application.

Accordingly, when a service application is invoking the telephone application to call the unknown number, the device 800 acquires an application type of the service application. The unknown number stored in calling records is labeled according to the application type. Since the unknown number provided by the service application can provide a certain type of service to the user, the unknown number can be labeled according to the application type of the service application. It solves the problem that the user may input an incorrect identification label for an unknown number, resulting in inaccurate labeling of the unknown number. The device 800 improves the accuracy in labeling an unknown number.

Further, labeling an unknown number stored in the calling records according to an application type solves the problem that in case where multiple unknown numbers are stored in the calling records, the user cannot discern between the unknown numbers. The device 800 allows the user to discern between unknown numbers.

With respect to the devices in the above embodiments, the specific manners for performing operations for individual modules therein have been described in detail in the embodiments of the methods, which will not be elaborated herein.

A device for labeling a number consistent with embodiments of the present disclosure can implement the methods for labeling a number as described above. The device for labeling a number includes a processor, and a memory for storing instructions executable by the processor.

The processor is configured to perform:

receiving an application identification of a service application and an unknown number sent from a calling terminal, the unknown number being a telephone number provided to a user by the service application, and the calling terminal invoking a telephone application through the service application to call the unknown number;

acquiring an application type of the service application according to the application identification; and labeling the unknown number according to the application type.

In some embodiments, the processor is configured to perform:

detecting whether a service application is invoking a telephone application to call an unknown number, the unknown number being a telephone number provided to a user by the service application;

when a service application is invoking the telephone application to call the unknown number, acquiring an application type of the service application; and labeling the unknown number stored in calling records according to the application type.

Figure 9:
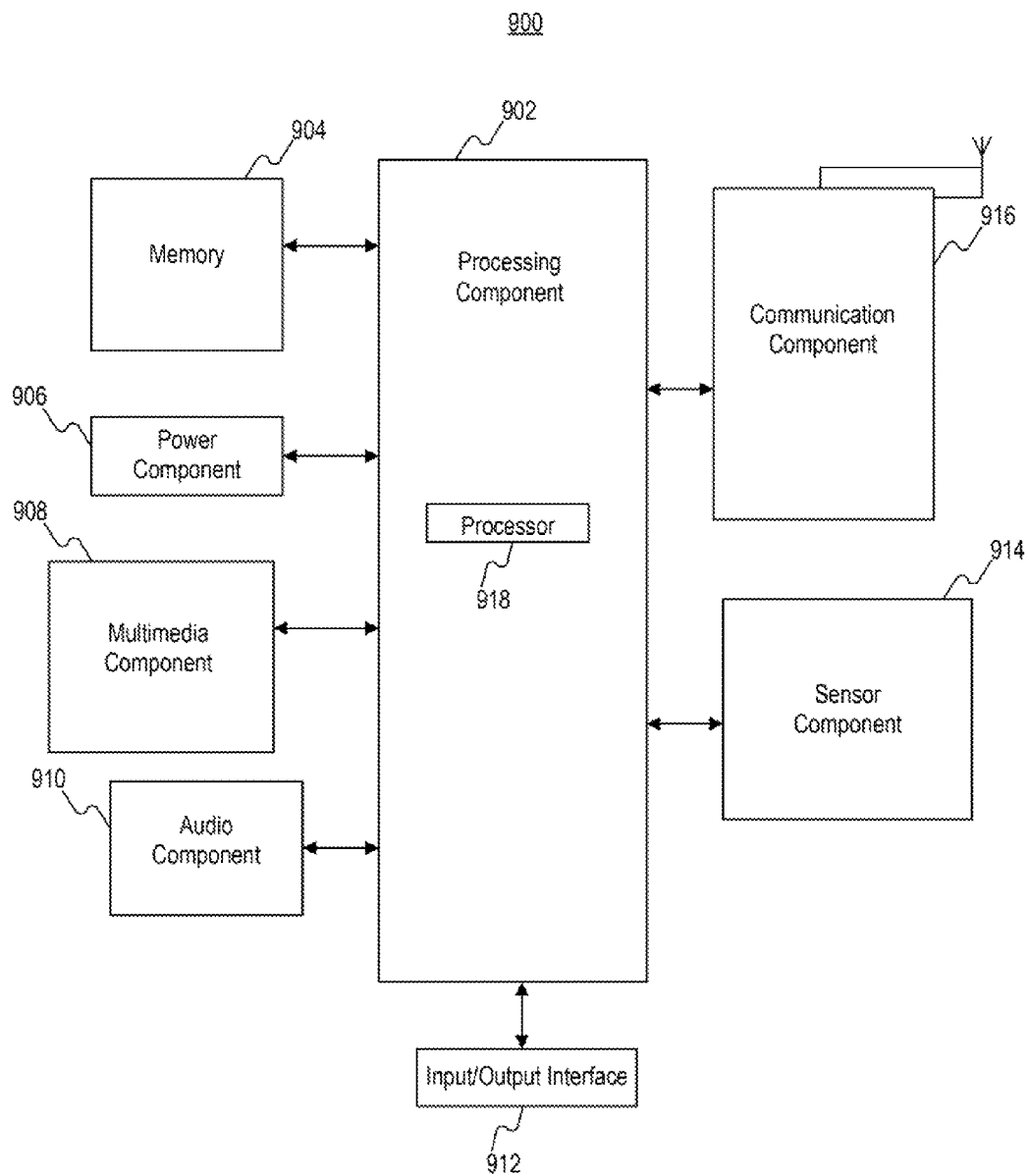
FIG. 9 is a block diagram of a device for labeling a number according to an exemplary embodiment.

FIG. 9 is a block diagram of a device 900 for labeling a number according to an exemplary embodiment. For example, the device 900 may be a mobile phone, a computer, a digital broadcast terminal, a messaging device, a gaming console, a tablet, a medical device, exercise equipment, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 918 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G or 3G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 918 in the device 900, for performing the above-described methods. For example, the non-transitory computer-readable storage medium may be a ROM, a RAM, a CD-ROM, a magnetic tape, a floppy disc, an optical data storage device, and the like.

Figure 10:
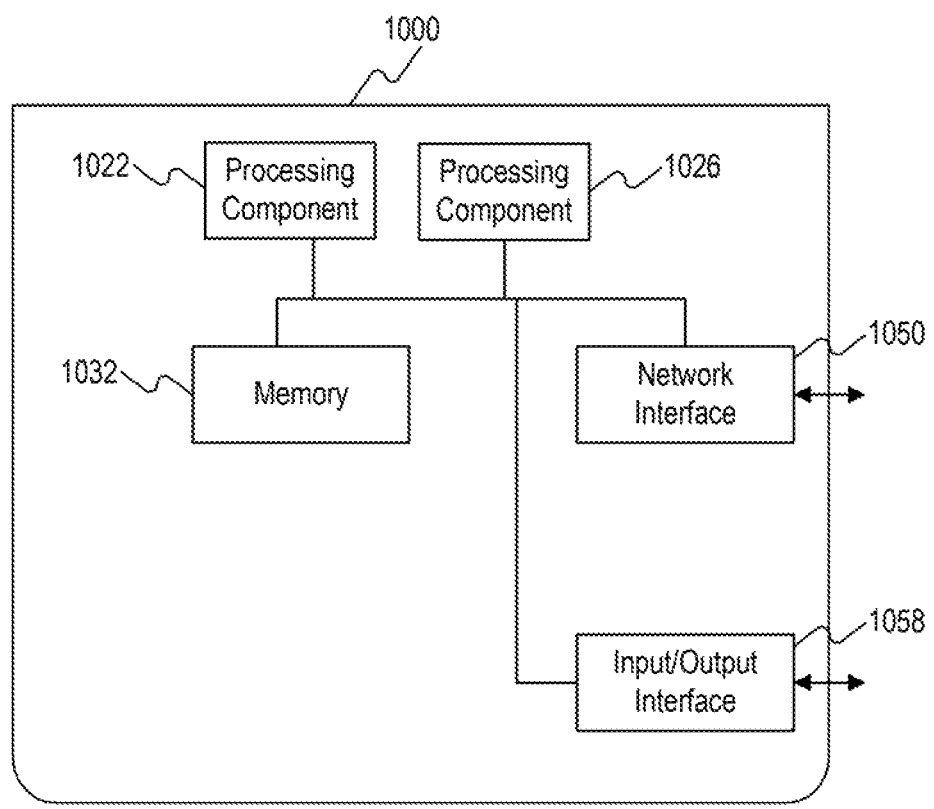
FIG. 10 is a block diagram of a device for labeling a number according to an exemplary embodiment.

FIG. 10 is a block diagram of a device 1000 for labeling a number according to an exemplary embodiment. For example, the device 1000 may be provided as a server. Referring to FIG. 10, the device 1000 includes a processing component 1022 that further includes one or more processors, and memory resources represented by a memory 1032 for storing instructions executable by the processing component 1022, such as application programs. The application programs stored in the memory 1032 may include one or more modules each corresponding to a set of instructions. Further, the processing component 1022 is configured to execute the instructions to perform the above described method for labeling a number.

The device 1000 may also include a power component 1026 configured to perform power management of the device 1000, wired or wireless network interface(s) 1050 configured to connect the device 1000 to a network, and an input/output (I/O) interface 1058. The device 1000 may operate based on an operating system stored in the memory 1032, such as Windows Server™, Mac OS X™, Unix™, Linux™, FreeBSD™, or the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a device to label a number, comprising:
receiving an application identification of a service application and an unknown number sent from a calling terminal, the unknown number being a telephone number provided to a user by the service application, and the calling terminal invoking a telephone application through the service application to call the unknown number;
acquiring an application type of the service application according to the application identification; and
labeling the unknown number according to the application type, wherein the labeling includes:
determining whether a user feedback label corresponding to the unknown number exists, the user feedback label being a feedback label regarding a user type of the unknown number, and being collected from a previous user of the service application;
when a user feedback label corresponding to the unknown number does not exist, labeling the unknown number with an attribute label corresponding to the application type;
when a user feedback label corresponding to the unknown number exists, labeling the unknown number with the user feedback label or the attribute label corresponding to the application type,
wherein the attribute label is for labeling a user type of the unknown number; and
wherein labeling the unknown number with the user feedback label or the attribute label corresponding to the application type includes:
detecting whether the attribute label is identical to the user feedback label;
when the attribute label is different from the user feedback label, acquiring a most recent user feedback label, and detecting whether a time duration between a first time when the user feedback label is generated and a current time is longer than a first predetermined time duration; and
when the time duration between the first time and the current time is longer than the first predetermined time duration, labeling the unknown number with the attribute label.

2. The method according to claim 1, further comprising:
when the time duration between the first time and the current time is shorter than the predetermined time duration, determining a first number of times when the user feedback label is received and a second number of times when the attribute label is received within a second predetermined time period;
when a difference between the second number and the first number is greater than a predetermined threshold, labeling the unknown number with the attribute label; and
when the difference between the second number and the first number is smaller than or equal to the predetermined threshold, labeling the unknown number with the user feedback label.

3. The method according to claim 1, further comprising:
when the calling terminal calls a call-receiving terminal corresponding to the unknown number, sending the application type to the call-receiving terminal to be displayed by the call-receiving terminal.

4. The method according to claim 2, further comprising:
when the calling terminal calls a call-receiving terminal corresponding to the unknown number, sending the application type to the call-receiving terminal to be displayed by the call-receiving terminal.

5. A device for labeling a number, comprising:
a processor; and
a memory for storing instructions executable by the processor;
wherein the processor is configured to perform:
receiving an application identification of a service application and an unknown number sent from a calling terminal, the unknown number being a telephone number provided to a user by the service application, and the calling terminal invoking a telephone application through the service application to call the unknown number;
acquiring an application type of the service application according to the application identification; and
labeling the unknown number according to the application type, wherein in labeling the unknown number according to the application type, the processor is further configured to perform:
determining whether a user feedback label corresponding to the unknown number exists, the user feedback label being a feedback label regarding a user type of the unknown number, and being collected from a previous user of the service application;
when a user feedback label corresponding to the unknown number does not exist, labeling the unknown number with an attribute label corresponding to the application type;
when a user feedback label corresponding to the unknown number exists, labeling the unknown number with the user feedback label or the attribute label corresponding to the application type,
wherein the attribute label is for labeling a user type of the unknown number; and
wherein in labeling the unknown number with the user feedback label or the attribute label corresponding to the application type, the processor is further configured to perform:
detecting whether the attribute label is identical to the user feedback label;
when the attribute label is different from the user feedback label, acquiring a most recent user feedback label, and detecting whether a time duration between a first time when the user feedback label is generated and a current time is longer than a first predetermined time duration; and
when the time duration between the first time and the current time is longer than the first predetermined time duration, labeling the unknown number with the attribute label.

6. The device according to claim 5, wherein the processor is further configured to perform:
when the time duration between the first time and the current time is shorter than the predetermined time duration, determining a first number of times when the user feedback label is received and a second number of times when the attribute label is received within a second predetermined time period;

when a difference between the second number and the first number is greater than a predetermined threshold, labeling the unknown number with the attribute label; and when the difference between the second number and the first number is smaller than or equal to the predetermined threshold, labeling the unknown number with the user feedback label.

7. The device according to claim 5, wherein the processor is further configured to perform:

when the calling terminal calls a call-receiving terminal corresponding to the unknown number, sending the application type to the call-receiving terminal to be displayed by the call-receiving terminal.

8. The device according to claim 6, wherein the processor is further configured to perform:

when the calling terminal calls a call-receiving terminal corresponding to the unknown number, sending the application type to the call-receiving terminal to be displayed by the call-receiving terminal.

9. A non-transitory computer-readable storage medium storing instructions that, when executed by a processor of a server, cause the server to perform:

receiving an application identification of a service application and an unknown number sent from a calling terminal, the unknown number being a telephone number provided to a user by the service application, and the calling terminal invoking a telephone application through the service application to call the unknown number;

acquiring an application type of the service application according to the application identification; and labeling the unknown number according to the application type, wherein the labeling includes:

determining whether a user feedback label corresponding to the unknown number exists, the user feedback label being a feedback label regarding a user type of the unknown number, and being collected from a previous user of the service application;

when a user feedback label corresponding to the unknown number does not exist, labeling the unknown number with an attribute label corresponding to the application type;

when a user feedback label corresponding to the unknown number exists, labeling the unknown number with the user feedback label or the attribute label corresponding to the application type, wherein the attribute label is for labeling a user type of the unknown number; and wherein labeling the unknown number with the user feedback label or the attribute label corresponding to the application type includes:

detecting whether the attribute label is identical to the user feedback label;

when the attribute label is different from the user feedback label, acquiring a most recent user feedback label, and detecting whether a time duration between a first time when the user feedback label is generated and a current time is longer than a first predetermined time duration; and when the time duration between the first time and the current time is longer than the first predetermined time duration, labeling the unknown number with the attribute label.

* * * * *